United States Patent [19]

Crase et al.

[11] 4,260,202

[45] Apr. 7, 1981

[54] BEARING ASSEMBLY

[75] Inventors: Gary M. Crase, Cypress; Kurt M. Trzeciak, Irvine, both of Calif.

[73] Assignee: Smith International, Inc., Newport Beach, Calif.

[21] Appl. No.: 67,923

[22] Filed: Aug. 20, 1979

[51] Int. Cl.³ .............................................. F16C 19/00
[52] U.S. Cl. ..................................... 308/8.2; 175/371; 308/174; 308/230
[58] Field of Search ....................... 175/107, 371, 372; 308/8.2, 37, 135, 139 R, 160, 161, 162, 174, 175, 227–231; 418/48

[56] References Cited

U.S. PATENT DOCUMENTS 4,198,104   4/1980   Crose ................................... 308/230

Primary Examiner—Frederick R. Schmidt
Attorney, Agent, or Firm—Philip Subkow; Bernard Kriegel

[57] ABSTRACT

A bearing assembly, for a drive shaft connected to an in-hole motor rotor to drive a bit and a housing connected to the motor stator has sets of oppositely acting thrust bearings having corresponding members of bearings and parts at opposite sides of a thrust member on the shaft. Plural sets of thrust bearings are shown between spaced radial bearings to optimize load distribution.

12 Claims, 8 Drawing Figures

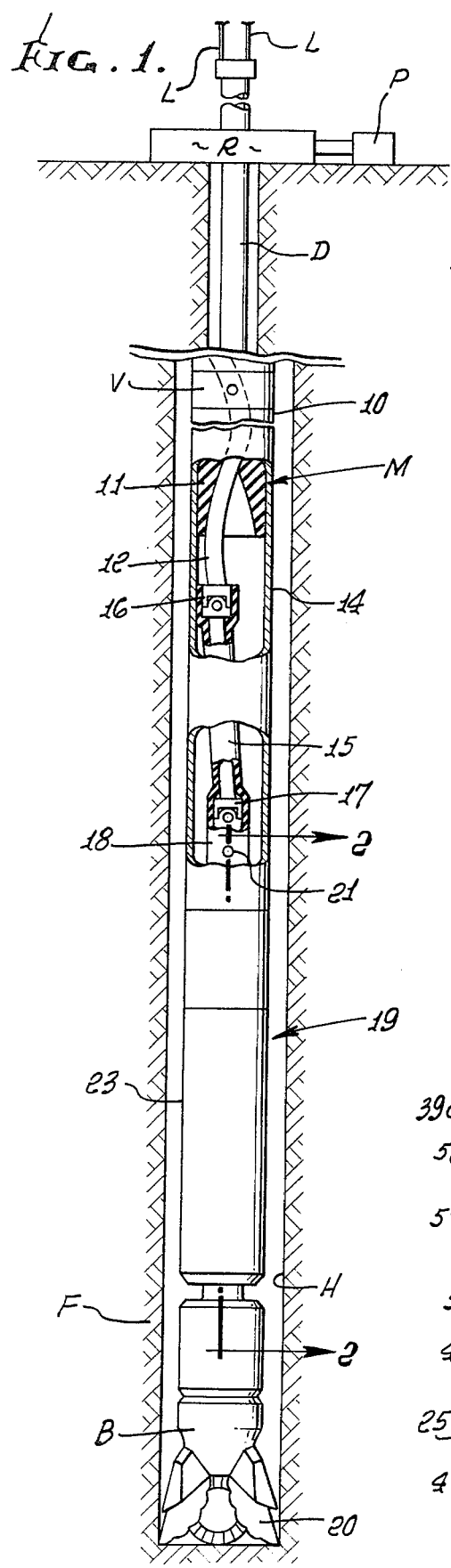
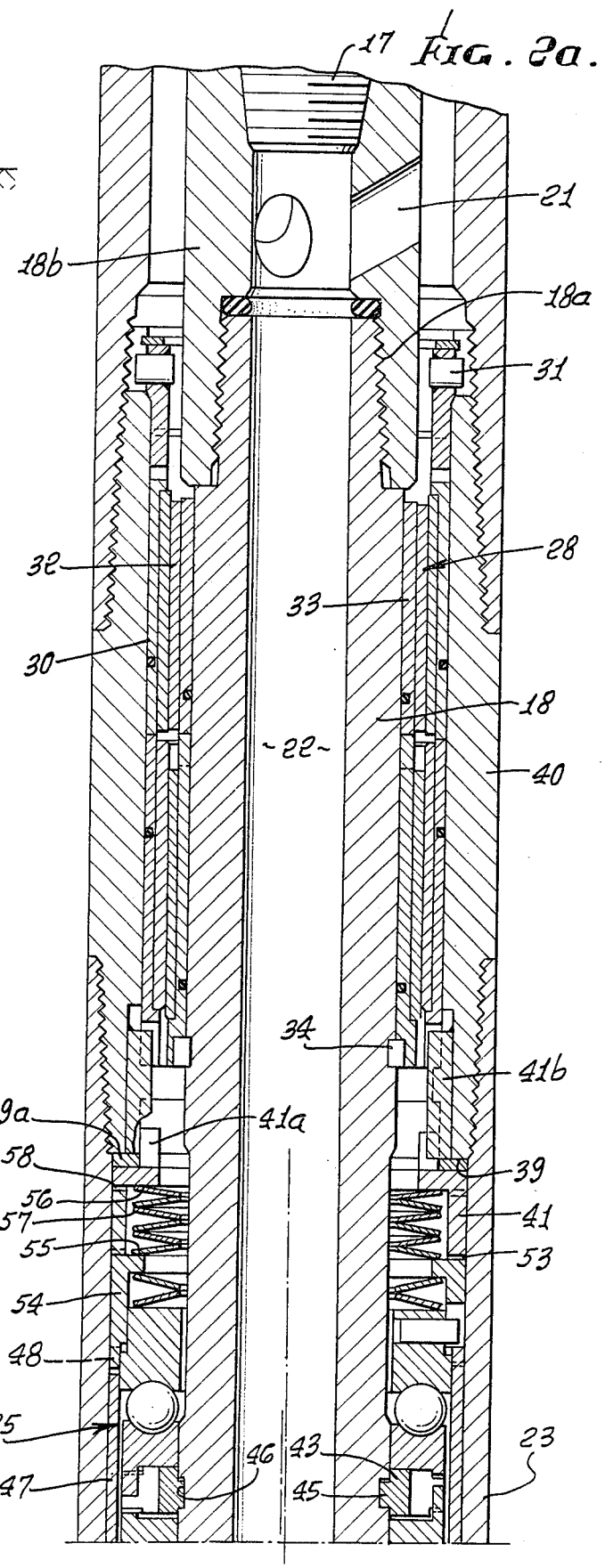

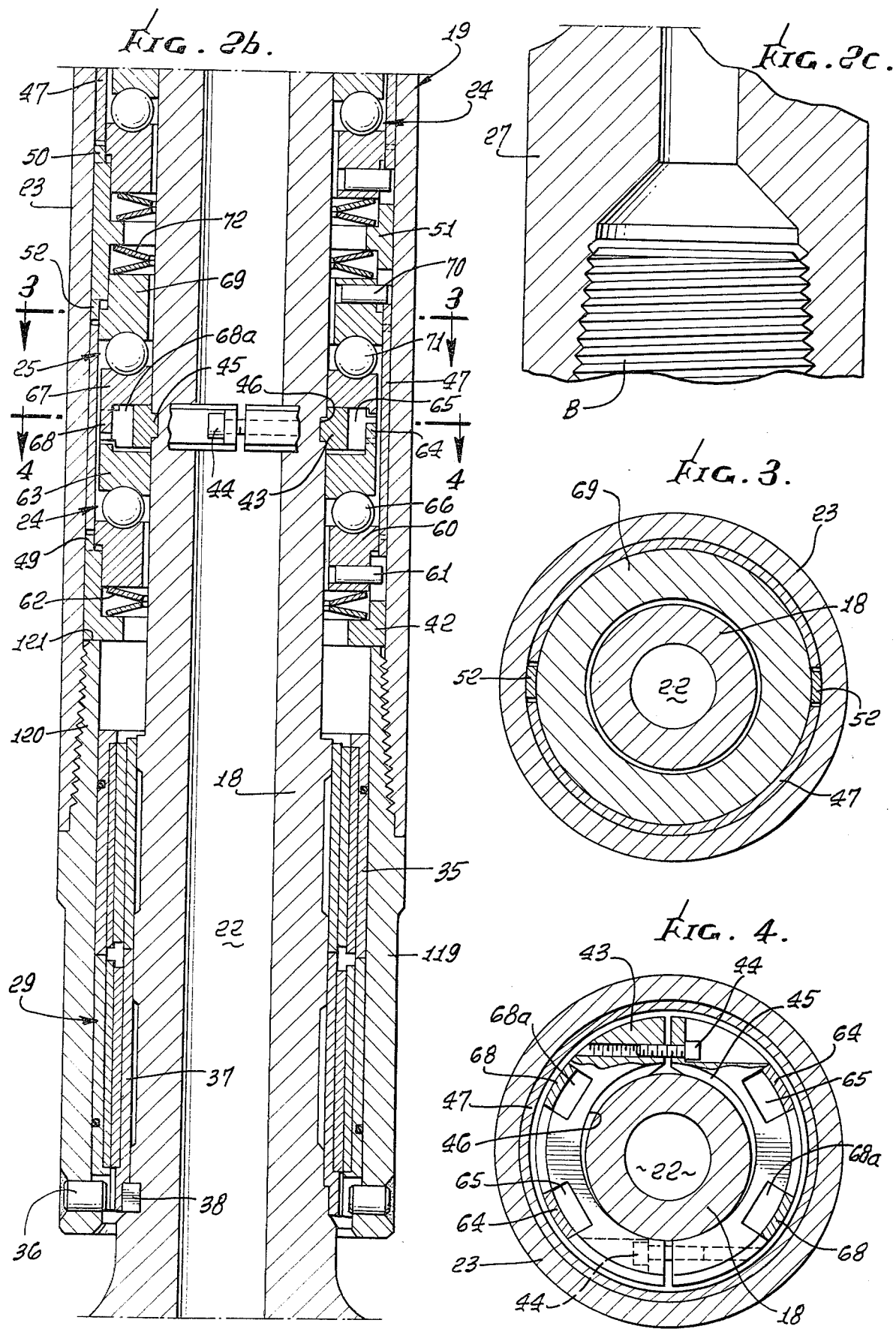

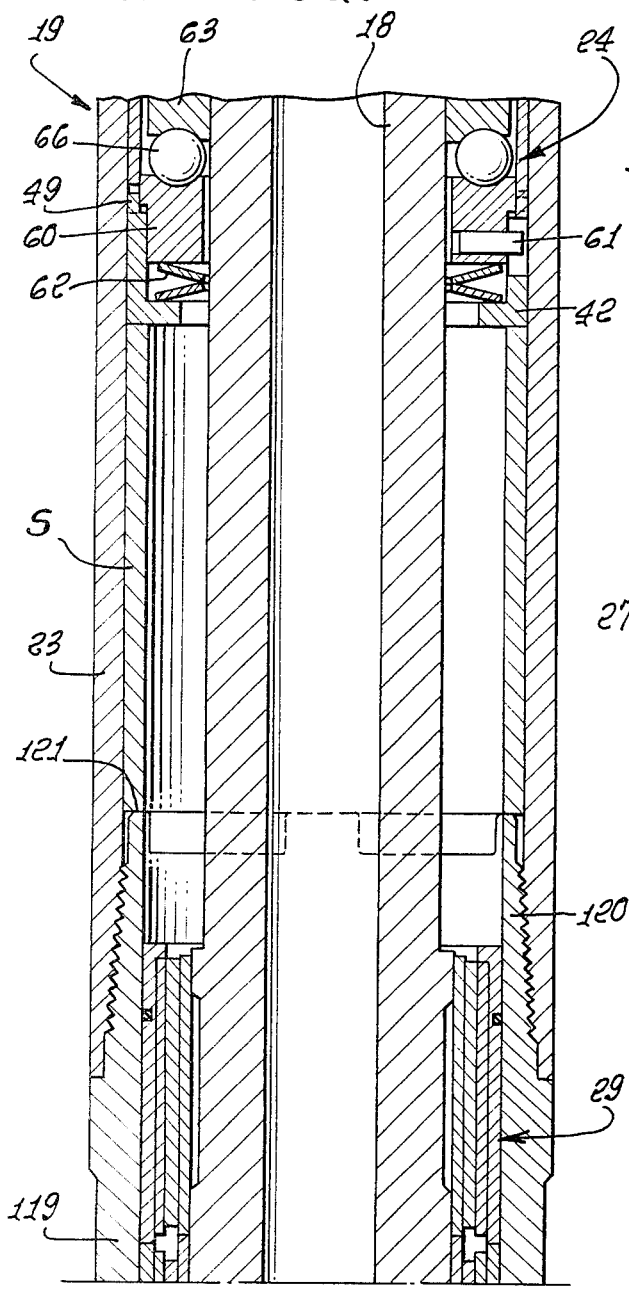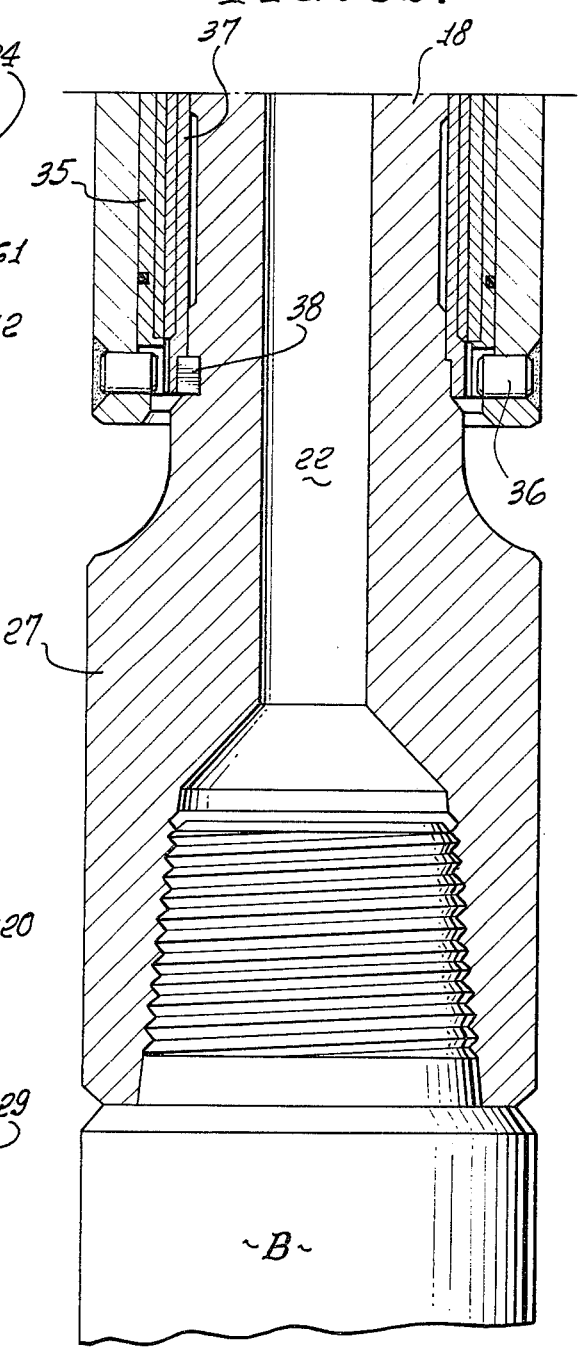

BEARING ASSEMBLY

BACKGROUND OF THE INVENTION

In the drilling of bore holes utilizing an in-hole motor, such as an in-hole positive displacement fluid motor or a fluid turbine, drilling thrust is applied to the drill bit through a shaft which is connected to the rotor of the motor. Bearings are provided which transfer the drilling thrust to the shaft from a housing which is connected to the stator of the motor. Other bearings thrasfer thrust from the housing to the shaft when the motor is pulled from the bore-hole or when the bit is held off the bottom of the bore hole during circulation of fluid to flush the bore hole or build up filter cake. Generally, such bearings are provided with springs to absorb the axial shock loading during drilling.

There are many examples of such bearing assemblies in the prior art. In my companion application Ser. No. 068,212, filed Aug. 20, 1979 there is shown a bit clutch operable in a bearing assembly to connect the housing to the shaft for mutual rotation. The clutch is incorporated in a novel bearing assembly which is the subject to the present application.

Bearing assemblies of the type shown in the above-identified patents are subject to severe conditions during use, including high thrust loads and lateral loads, severe shock loading, and the deleterious effects of the erosive drilling fluid. Certain of the prior bearing assemblies have been of the so-called drilling fluid lubricated type U.S. Pat. No. 4,029,368, issued June 14, 1977, to Tschirky and Crase) wherein a portion of the drilling fluid flows through the bearings, between the shaft and the housing, to cool and lubricate the bearings, resulting in rapid erosion of the moving parts. Other bearing assemblies have been sealed U.S. Pat. No. 3,874,818, issued July 15, 1975, to Tschirky and Crase) to enable the bearings to operate in a clean lubricant. Bearings have also been utilized wherein the bearings are adjustably stacked, enabling elimination of manufacturing tolerances, and taking up wear (Crase application, Ser. No. 914,271, filed June 9, 1978 now U.S. Pat. No. 4,198,104.

During drilling operations the severe thrust loads are transmitted to the bit by certain thrust bearings. During off bottom circulation the thrust load is taken by other bearings. The thrust load during application of weight to the bit and the thrust loads caused by hydraulic effects on the motor rotor are both very damaging to the bearings. Unequal load distribution is a problem which can cause excessive wear of certain of the bearings when the other bearings are still useful, resulting in loss of drilling time for service and repair. Unequal load distribution is aggravated in the case of slant hole drilling.

To the extent that bearing parts, in such assemblies, become worn and must be discarded, during service, the cost of such parts is significant. When different parts are employed, the cost of service and repair is increased, due to the need for maintaining an inventory of a large number of replacement parts.

SUMMARY OF THE INVENTION

The present invention relates to a bearing assembly, for use with in-hole motor drilling equipment, wherein the bearing assembly comprises bearing sets composed of similar parts to transmit thrust in opposite longitudinal directions from the housing to optimize load distribution.

More particularly, the bearing elements, including races and balls in the structure shown, are comprised of similar thrust applying and thrust receiving races, at opposite sides of a thrust collar on the shaft, thereby minimizing the number of different parts necessary to produce a bearing assembly having a desired number of similar bearing sets, equally distributing the thrust load. These bearings are located between upper and lower radial bearings.

The parts of the bearing set or sets are interchangeable, in that the thrust transmitting races, are of the same configuration in the drilling thrust bearing and the pick-up or off bottom thrust bearing. Also, the thrust receiving races are of the same configuration and interchangeably engageable with either side of a thrust collar which also keys the thrust receiving races on the shaft.

Corresponding thrust transmitting members are also employed to transmit thrust to the drilling thrust bearings from a thrust shoulder on the housing to the thrust collar on the shaft in the bearing sets. A simple thrust transfer element is employed between adjacent similar bearing sets, and cushioning springs are incorporated between adjacent sets to absorb the rapid longitudinal forces applied to the shaft during rotary drive of the bit, as the bit tends to "dance" in the bottom of the hole.

The bearing structure is compatible with a bit clutch, as disclosed in our companion application Ser. No. 068,212, but as herein illustrated, the bearing structure is operable without the bit clutch in a housing which can be of reduced length, or in a housing of sufficient length to accommodate the clutch of the just-mentioned application, but with a spacer in lieu of the clutch.

This invention possesses many other advantages, and has other objects which may be made more clearly apparent from a consideration of several forms in which it may be embodied. Such forms are shown in the drawings accompanying and forming part os the present specification. These forms will now be described in detail for the purpose of illustrating the general principles of the invention; but it is to be understood that such detailed description is not to be taken in a limiting sense.

BRIEF DESCRIPTION OF THE DRAWINGS

FIG. 1 is a view diagramatically showing an in-hole motor drill, partly in elevation and partly in section, in an earth bore hole, and incorporating bearing structure in accordance with the invention;

FIGS. 2a, 2b and 2c, together, constitute an enlarged longitudinal section, as taken on the line 2—2 of FIG. 1, showing the bit bearing construction, with the bit loaded;

FIG. 3 is a transverse section, as taken on the line 3—3 of FIG. 2b;

FIG. 4 is a transverse section as taken on the line 4—4 of FIG. 2b; and

FIGS. 5a and 5b, together, constitute a fragmentary view corresponding with FIG. 2b, but showing a spacer between the lower bearing and a shoulder in the housing.

As seen in the drawings, referring first to FIG. 1, an in-hole motor assembly M is connected to the lower end of a string of drilling fluid conducting drill pipe D and has its housing 10 providing a progressing cavity stator 11 for a rotatable helicoidal rotor 12. The illustrative motor is a positive displacement-type fluid motor of a known type, but the motor may be of other types, such as a turbine. The rotor is driven by the downward flow of fluid supplied to the pipe string from the usual pump P on a drilling rig having a rotary R which can rotate the pipe D suspended by the usual drilling lines L of a rig (not shown). A normally closed circulation valve V is in the pipe above the motor. The fluid passes downwardly through a connecting rod housing section 14 which contains a connecting rod assembly 15, connected by a universal joint 16 to the lower end of the rotor 12 and by a universal joint 17 to the upper end of the drive shaft 18. The drive shaft extends downwardly through a bearing assembly 19, and at its lower end, the drive shaft is connected to a drill bit B, having cutters 20 adapted to drill through the earth formation F, in the drilling of a bore hole H. The drive shaft 18 is tubular and has, adjacent its upper end, inlet ports 21, through which the drilling fluid passes from the connecting rod housing 14 into the elongated central bore 22 of the drive shaft, the fluid exiting from the bit B to flush cuttings from the bore hole and cool the bit.

During operation of the fluid motor M, the lower end of the rotor 12 has an eccentric motion which is transmitted to the drive shaft 18 by the universal connecting rod assembly 15, and the drive shaft 18 revolves about a fixed axis within the outer housing structure 23 of the bearing assembly 19, the drive shaft being supported within the housing by bearing means 24 and 25 shown in FIGS. 2a and 2b.

The bearing assembly of U.S. Pat. No. 4,029,368 is mud lubricated and a certain amount of the total volume of the circulating fluid is allowed to flow through the bearings, at a rate determined by flow restrictor sleeves, due to the differential pressure caused by the restricted flow of the majority of the circulating or drilling fluid through the bit nozzles, as is well known. The bearings of that patent and all the bearing assemblies of the same general type have set down bearings to transmit axial load from the drill string to the bit, through the drive shaft, and pick-up or off bottom bearings by which the bit is pulled from the hole, when the drill string is pulled.

In the case of the bearings 24 and 25, the bearing means 24 is a pick-up bearing, while the bearing means 25 is the set down bearing, as will be well understood and as will be more fully described below.

Referring to FIGS. 2a and 2b, it will be seen that the elongated tubular shaft is connected at its upper end by a threaded joint 18a to a connector cap 18b which contains the inlet ports 21 and which connects the upper end of the shaft to the universal joint 17 by a threaded connection. At its lower end, the shaft 18 projects from the housing 23 of the bearing assembly 19, and has an enlarged, lower bit connector 27, to which the threaded pin of the bit B is connected, in the usual manner.

The drilling fluid which is circulated by the pump P, downwardly through the pipe string D and through the motor M, as previously indicated, finds access to the passage 22 through the shaft 18, by the ports 21, and a certain limited portion of the drilling fluid is permitted to flow between the housing and the shaft to lubricate the bearings 24 and 25. Alternatively, it will be understood by those skilled in the art that the bearing assembly may be of a sealed construction, such as that disclosed in the above-identified U.S. Pat. No. 3,894,818. In the illustrative form, the flow of drilling fluid through the bearings of the bearing assembly is restricted by upper flow restrictor and radial bearing means 28 (FIG. 2a) and lower radial bearing means 29 (FIG. 2b). Such radial bearings are more particularly disclosed and are the subject of the U.S. Pat. No. 4,029,368 identified above. The upper flow restrictor means 28 includes an outer flow restrictor sleeve assembly 30 which is pinned to the housing by suitable pins 31 and has internal wear resistant elements 32 therein, which may be constructed in accordance with the above-identified patent. Internally of the flow restrictor sleeve 30 is a flow restrictor sleeve 33 which is locked or keyed to the shaft by locking means 34, for rotation with the shaft. These flow restrictor sleeves limit the amount of drilling fluid which can pass downwardly from the housing above the flow restrictor sleeve into the region of the thrust bearings 24 and 25, later to be described. Correspondingly, the lower radial bearing means 29 includes an outer sleeve 35 which is pinned as at 36, to the housing and an inner sleeve 37, which is connected or keyed as at 38 to the shaft for rotation therewith.

The thrust bearings 25, as seen in FIGS. 2a and 2b, are adapted to transmit drilling thrust or load from the drill string D, through the housing structure of the bearing assembly to the shaft 18, to impose weight upon the bit, during drilling, as drilling fluid is pumped downwardly through the running string D and the motor M to rotate the shaft within the housing. Thus, as seen in FIG. 2a, the housing structure includes a downwardly facing shoulder 39, provided at the lower end of the threaded pin of a flow restrictor sub 40. The shoulder 39 engages a string 39a which in turn, which engages an annular spring seat and thrust member 41 suitably keyed to the housing by lugs 41a, on member 41, which projects upwardly and straddles keys 41b welded in the sub 40. Thrust member 41 is thereby non-rotatably mounted in the housing. As seen in FIG. 2b, there is a lower thrust member 42, which in a manner to be later described, is in thrust transfer relationship with the housing, to transmit thrust upwardly to the shaft upon elevation of the housing.

As shown, the bearing assembly includes between the opposing thrust members 41 and 42 two sets of bearings 24 and 25, in tandem, adapted to equally distribute the load upon opposite loading of the housing in an axial direction, to transmit thrust to a pair of thrust collars 43 mounted on the shaft, as seen in FIGS. 2a and 2b. As seen in FIG. 4, these thrust collars 43 are split rings, secured about the shaft by fastener screws 44, with an internal flange 45 disposed in a groove 46 in the shaft, the flange and groove being eccentric with respect to the shaft, to secure the collar on the shaft against relative rotation. Each bearing set includes a spacer sleeve 47, the upper spacer sleeve 47 having a drive lug connection 48 with an upper locking adaptor 54 which has a lug connection 53 with the thrust member 41. The lower spacer sleeve 47 has a drive lug connection 49 with the thrust member 42. The upper spacer sleeve 47 spans the upper thrust collar 43 and has a drive lug connection 50 with an intermediate thrust transfer member 51 which also has a drive lug connection 52 with the lower thrust sleeve or spacer sleever 47.

Referring to FIG. 2a, it is seen that the thrust member 54 provides an upwardly facing shoulder 55 opposed by the undersurface 56 of the thrust member 41, between which is disposed a stack of Belville springs 57. The lug connection 53 between the thrust member 41 and the thrust member 54 is constructed to afford a certain amount of relative axial movement as indicated at the gap 58, whereby the springs 57 can be selected to apply a certain amount of axial loading downwardly from the downwardly facing shoulder 56 to the thrust member 54, to the upper thrust transmitting spacer 47, the thrust member 51, the lower spacer 47 and to the lower thrust member 42 in a manner in which all of the bearings 24 and 25 are maintained under a spring load, during operation of the motor drill, both during the drilling of the bore hole, and when the bit is off bottom and fluid is being circulated.

As previously indicated, the sets of bearings are in tandem and each acts upon one of the thrust collars 43. As seen in FIG. 2b, the bearing 24 will be seen to include a lower race 60 pinned as at 61 to the lower thrust member 42 for mutual rotation and relative longitudinal movement. Belleville springs 62 are engaged between the thrust member 42 and the race 60 to provide for shock absorption, the springs 62 having a strength greater than the strength of the springs 57. An upper race 63 is secured to the shaft, for rotation therewith by a suitable number of lugs 64 which engage in circumferentially spaced notches 65 provided in the thrust collar 43. Since the collar 43 is locked on the shaft, the lugs 64 lock the race 63 on the shaft for mutual rotation. Bearing balls 66 are disposed in raceways in the respective bearing races 60 and 63.

Above the thrust collar 43 of FIG. 2b, the set down bearing 25 has a lower race 67 secured to the shaft for unitary rotation by a suitable number of lugs 68 which extend into notches 68a in the thrust collar 43. Since the thrust collar 43 is secured to the shaft, the bearing race 67 is correspondingly, by the lugs 68, connected to the shaft for mutual rotation. An upper bearing race 69 is connected by a number of pins 70 to the intermediate thrust member 51 for mutual rotation and relative longitudinal movement, and bearing balls 71 are disposed in raceways in respective races 67 and 69. The bearing 25 is cushioned against shock, during drilling operations, by Belleville springs 72 disposed between the thrust member 51 and the upper race 69, the springs 72 also being stronger than the preloading springs 57 at the upper end of the bearing assembly.

The pick-up bearing 24, at the upper end of FIG. 2b, and the set down bearing 25 at the lower end of FIG. 2a, constitute a bearing assembly which is the same as that just described, and thrust is transmitted in either direction to the upper thrust collar 43, in the same manner described with respect to the lower bearings. Therefore no further description of the upper bearing assembly is believed necessary to an understanding of the present invention.

At this point it should be noted that each bearing set, including a bearing 24 and a bearing 25 is of simple construction, and comprises similar bearing races. This is to say that race 60 of bearing 24 and race 69 of bearing 29 are identical components, keyed or pinned to the thrust transmitting members in the same manner. Likewise, race 63 of bearing 24 and race 67 of bearing 25 are identical components, and the thrust collar is constructed to key these races to the shaft in the same manner. Moreover, each bearing set is composed of corresponding parts, and a plurality of sets 24, 25 are applicable to the shaft by interposing in the thrust members an intermediate thrust member and spring seat 51.

During operation of the motor drill apparatus, the bearings are alternately thrust loaded. The bearing assembly is shown in FIGS. 2a and 2b as being loaded downwardly to apply thrust or drilling weight to the bit. Under these circumstances, a clearance space 63a exists between the upper race 63 of each pick-up bearing 24 and the thrust collar 43, when the set-down bearings 25 are loaded. When thrust is reversed, to pick-up the shaft, the lower pick-up bearing races 63 will engage the thrust collars 43, and the lower races 67 of each set down bearing will move upwardly. Such movement is resisted by the Belleville springs 57 between locking adaptor 54 and thrust member 41, so that the springs 57 maintain a preload on the that the springs 57 maintain a preload on the bearings to prevent loose running of the bearings and resultant damage. The pre-load springs 57 maintain a downward force on the thrust transfer member 54, the spacers 47 and the thrust member 51, thereby loading the cushioning springs 62 and 72, so that under all conditions the bearings are spring loaded sufficient to prevent impact damage which can occur when the bearings are loose.

As previously indicated, the lower thrust transfer member 42 is in thrust transfer relation with the housing. As herein shown two forms are provided.

In FIG. 2b, it will be seen that the lower radial bearing 29 is in a lower bearing housing section 119 having an externally threaded pin 120 engaged in the upwardly extended bearing housing 19. The thrust member 42 seats in the upper end 121 of the pin 120. In such a construction, the housing is made of sufficient length to accommodate the bearings and thrust members, and tolerance is taken up and the desired spring preload is established by the string 39a between shoulder 39 in the housing and upper thrust member 41.

In FIGS. 5a and 5b, the construction of the bearings is the same as that described above, except that the bearing housing 19 is shown to be of sufficient length as to accommodate a clutch (not shown) between the upper pin end 121 and the lower thrust member 42. Such a clutch is the subject of the companion application Ser. No. 068,212. In this case, a spacer sleeve S is installed between the pin shoulder 121 and the lower thrust member 42.

One purpose of illustrating the use of a spacer sleeve is to illustrate the compact nature of the present bearing assembly. This will be understood when it is recognized that the bearing housing 19 was of a predetermined length to accommodate prior bearing structures, such as disclosed in application, Ser. No. 914,271, now U.S. Pat. No. 4,198,104, to which reference is made. The present bearing assembly was designed in such a manner, incorporating common parts as to afford space for a clutch, as referred to above. Such reduced length of the bearings is represented by the length of the spacer S.

It will be noted that the assembly includes the shaft and housing supported by the axially spaced radial bearings. Between these radial bearings 28 and 29, the thrust bearings 24 and 25 are arranged in similar sets, to optimize the load distribution. Equal numbers of bearing units are provided to transmit thrust during drilling, when weight is applied to the bit, and during off bottom circulation when hydraulic thrust on the motor rotor is taken by the housing. Two sets of bearings 24 and 25 are shown. In a simple form, a single set may be employed, but if desired other multiples of bearings may be employed, say three or more pick-up and a corresponding three or more set down bearings.

Moreover, in view of the similarity of parts manufacturing costs and inventory of parts is reduced, and service and parts replacement are facilitated.

We claim:

1. A bearing assembly for an in-hole motor having a stator and a rotor, said assembly including: a housing adapted for connection to said stator; a shaft in said housing adapted for connection to said rotor; bearing between said shaft and said housing in thrust transmitting relation therewith; said bearing including a member on said shaft having oppositely facing thrust shoulders, said bearing including a first pair of bearing elements one on one side of member said one on the other side of said member and engageable with said shoulders, a connection between said first pair of bearing elements and said shaft for unitary rotation thereof; a second pair of bearing elements, one of said second pair opposing one of said first pair for thrust transmission in opposite directions; a connection between said housing and said second pair of bearing elements for unitary rotation thereof; and opposing thrust members in said housing for transmitting thrust in opposite directions to said first pair of bearing elements through said second pair of bearing elements.

2. A bearing assembly as defined in claim 1; including springs between said thrust members and said second pair of bearing elements.

3. A bearing assembly as defined in claim 1; said member on said shaft being locked on said shaft for rotation therewith; said first pair of bearing elements being connected to said shaft by said member.

4. A bearing assembly as defined in claim 1; said member on said shaft being locked on said shaft for rotation therewith; said first pair of bearing elements and said member having interfitting portions connecting said first pair of bearing elements to said shaft.

5. A bearing assembly as defined in claim 1; said member on said shaft being locked on said shaft for rotation therewith; said first pair of bearing elements and said member having interfitting portions connecting said first pair of bearing elements to said shaft, said first pair of bearing elements being of the same configuration and turned oppositely to engage said member.

6. A bearing assembly as defined in claim 1; said member on said shaft being locked on said shaft for rotation therewith; said first pair of bearing elements and said member having interfitting portions connecting said first pair of bearing elements to said shaft, said first pair of bearing elements being of the same configuration and turned oppositely to engage said member, said second pair of bearing elements being of the same configuration and turned oppositely to oppose said first pair of bearing elements.

7. A bearing assembly for an in-hole motor having a stator and a rotor, said assembly comprising: a housing adapted for connection to said stator; a shaft in said housing adapted for connection to said rotor; bearing between said shaft and said housing including a plurality of axially spaced sets of thrust bearings, each set including a member on said shaft having oppositely facing thrust shoulders, a first pair of bearing elements one on each side of said member and engageable with one of said shoulders, a connection between said first pair of bearing elements and said shaft for unitary rotation thereof; a second pair of bearing elements, one of said second pair opposing one of said first pair for thrust transmission in opposite directions; a connection between said housing and said second pair of bearing elements for unitary rotation thereof; and opposing thrust members in said housing for transmitting thrust in opposite directions to said first pair of bearing elements through said second pair of bearing elements.

8. A bearing assembly as defined in claim 7; including radial bearings between said shaft and said housing at opposite sides of said thrust bearings.

9. A bearing assembly as defined in claim 7; said housing having axially spaced, opposed thrust shoulders engaged by said thrust members, one of said thrust members being between adjacent sets of thrust bearings in thrust transfer with one of the second pair of bearing elements of each set to transfer thrust in opposite directions.

10. A bearing assembly as defined in claim 7; said housing having axially spaced, opposed thrust shoulders engaged by said thrust members, one of said thrust members being between adjacent sets of thrust bearings in thrust transfer with one of the second pair of bearing elements of each set to transfer thrust in opposite directions; and including springs between said thrust members and said second pair of bearing elements of each set.

11. A bearing assembly as defined in claim 7; said housing having axially spaced, opposed thrust shoulders engaged by said thrust members, one of said thrust members being between adjacent sets of thrust bearings in thrust transfer with one of the second pair of bearing elements of each set to transfer thrust in opposite directions; said thrust members being interconnected with said housing, said second pair of bearing elements of each set being connected with said housing by said thrust members.

12. A bearing assembly as defined in claim 7; said housing having axially spaced, opposed thrust shoulders engaged by said thrust members, one of said thrust members being between adjacent sets of thrust bearings in thrust transfer with one of the second pair of bearing elements of each set to transfer thrust in opposite directions; and including springs between said thrust members and said second pair of bearing elements of each set, said thrust members being interconnected with said housing, said second pair of bearing elements of each set being connected with said housing by said thrust members.

* * * * *